United States Patent
Lee et al.

(10) Patent No.: US 9,654,688 B2
(45) Date of Patent: May 16, 2017

(54) LOW-POWERED IMAGE PROCESSING DEVICE AND METHOD OF DRIVING IMAGE PROCESSING DEVICE WITH LOW POWER

(71) Applicant: HANWHA TECHWIN CO., LTD., Changwon-si (KR)

(72) Inventors: Joonsung Lee, Changwon-si (KR); Minsuk Sung, Changwon-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 54 days.

(21) Appl. No.: 14/695,187

(22) Filed: Apr. 24, 2015

(65) Prior Publication Data

US 2016/0156845 A1 Jun. 2, 2016

(30) Foreign Application Priority Data

Nov. 28, 2014 (KR) .......................... 10-2014-0169186

(51) Int. Cl.
*H04N 21/4223* (2011.01)
*H04N 5/232* (2006.01)

(52) U.S. Cl.
CPC ............................... *H04N 5/23241* (2013.01)

(58) Field of Classification Search
CPC ........... H04N 5/23241; H04N 5/23206; H04N 21/4223
See application file for complete search history.

(56) References Cited

U.S. PATENT DOCUMENTS

| | | | |
|---|---|---|---|
| 7,609,952 B2 | 10/2009 | Jezierski et al. | |
| 7,928,842 B2 | 4/2011 | Jezierski et al. | |
| 8,193,933 B2 | 6/2012 | Jezierski et al. | |
| 8,723,957 B2 | 5/2014 | Kim et al. | |
| 9,350,519 B2* | 5/2016 | Ma | H04L 5/0066 |
| 9,521,147 B2* | 12/2016 | Barton | H04L 63/10 |
| 2010/0141762 A1* | 6/2010 | Siann | H04N 7/185 348/143 |

FOREIGN PATENT DOCUMENTS

| | | |
|---|---|---|
| KR | 10-2009-0112979 A | 10/2009 |
| KR | 10-2011-0069628 A | 6/2011 |
| KR | 10-1215549 B1 | 12/2012 |

* cited by examiner

*Primary Examiner* — Tuan Ho
(74) *Attorney, Agent, or Firm* — Sughrue Mion, PLLC

(57) ABSTRACT

Provided is an image processing device which includes: an event detector configured to detect a first event occurring at the AP by analyzing a response signal which the AP transmits to a transceiver of a camera in response to a query signal transmitted from the transceiver to the AP; and a power controller configured to place a sensor, the transceiver and a plurality of other elements constituting the camera in an activated state, in response to the event detector detecting the first event, wherein the power controller places the other elements in a deactivated state while at least one of the sensor and the transceiver is in the activated place, unless the first event is detected by the event detector, a second event is detected by the sensor, or a predetermined setting is provided.

19 Claims, 5 Drawing Sheets

LOW-POWERED IMAGE PROCESSING DEVICE AND METHOD OF DRIVING IMAGE PROCESSING DEVICE WITH LOW POWER

CROSS-REFERENCE TO THE RELATED APPLICATION

This application claims priority from Korean Patent Application No. 10-2014-0169186, filed on Nov. 28, 2014, in the Korean Intellectual Property Office, the disclosure of which is incorporated herein in its entirety by reference.

BACKGROUND

1. Field

Apparatuses and methods consistent with exemplary embodiments relate to image processing, and more particularly, to image processing driven with low power.

2. Description of the Related Art

In the related art, even when an event is detected in an image processing device such as a monitoring camera, since processing of the event is not performed in the image processing device unless an external signal is received, latency may occur until a point of time when image data related to the event is processed and transmitted from the image processing device.

Additionally, the image processing device needs to be always turned on so as to receive the external signal, which causes excessive power consumption.

SUMMARY

Exemplary embodiments of an inventive concept provide a method of, if an event is detected in an image processing device, reducing latency that may occur until image data captured and processed at the image processing device is transmitted to an external device.

The exemplary embodiments also provide a method of controlling power supply to a camera including the image processing device and, if an event is not present, switching power of elements of a camera, other than elements for detecting an event, to a deactivation mode so as to drive the camera with low power.

Various aspects of the inventive concept will be set forth in part in the description which follows and, in part, will be apparent from the description, or may be learned by practice of the presented embodiments.

According to one or more exemplary embodiments, there is provided an image processing device which may include: an event detector configured to detect a first event occurring at the AP by analyzing a response signal which the AP transmits to a transceiver of a camera in response to a query signal transmitted from the transceiver to the AP; and a power controller configured to place a sensor, the transceiver and a plurality of other elements constituting the camera in an activated state, in response to the event detector detecting the first event, wherein the power controller places the other elements in a deactivated state while at least one of the sensor and the transceiver is in the activated place, unless the first event is detected by the event detector, a second event is detected by the sensor, or a predetermined setting is provided. The power controller may place the sensor in the activated state while placing the other elements and the transceiver in the deactivated state.

The image processing device may further include a synchronizer configured to generate and transmit an event signal to the AP via the transceiver, in response to the sensor detecting the second event, wherein the event signal includes information indicating that the sensor has detected the second event. The synchronizer may be further configured to transmit the event signal to the AP via the transceiver not as a response to a query signal from the AP checking whether the second event is detected by the sensor. The sensor may be configured to capture at least one of an image, video and audio and the transceiver is configured to transmit the captured at least one of the image, video and audio to the AP, if an acknowledgement (ACK) signal from the AP is received in response to the event signal.

According to one or more exemplary embodiments, there is provided an image processing device which may include: a synchronizer configured to generate and transmit an event signal to an access point (AP) via a transceiver of a camera, in response to a sensor of the camera detecting a first event; and a power controller configured to place the sensor, the transceiver and a plurality of other elements constituting the camera in an activated state, in response to the sensor detecting the first event, wherein the power controller is further configured to place the other elements in a deactivated state while at least one of the sensor and the transceiver is in the activated place, unless the first event is detected by the sensor or a second event occurring at the AP is detected, or a predetermined setting is provided.

According to one or more exemplary embodiments, there is provided a method of driving an image processing device with low power which may include: detecting a first event occurring at an access point (AP) by analyzing a response signal which the AP transmits to a transceiver of a camera in response to a query signal transmitted from the transceiver to the AP; controlling a sensor, the transceiver and a plurality of other elements constituting the camera to be in an activated state, in response to the detecting the first event; and controlling the other elements to be in a deactivated state while at least one of the sensor and the transceiver is in the activated place, unless the first event is detected, a second event occurring at the AP is detected, or a predetermined setting is provided.

BRIEF DESCRIPTION OF THE DRAWINGS

These and/or other aspects will become apparent and more readily appreciated from the following description of the exemplary embodiments, taken in conjunction with the accompanying drawings, in which.

DETAILED DESCRIPTION OF THE EXEMPLARY EMBODIMENTS

Figure 1:
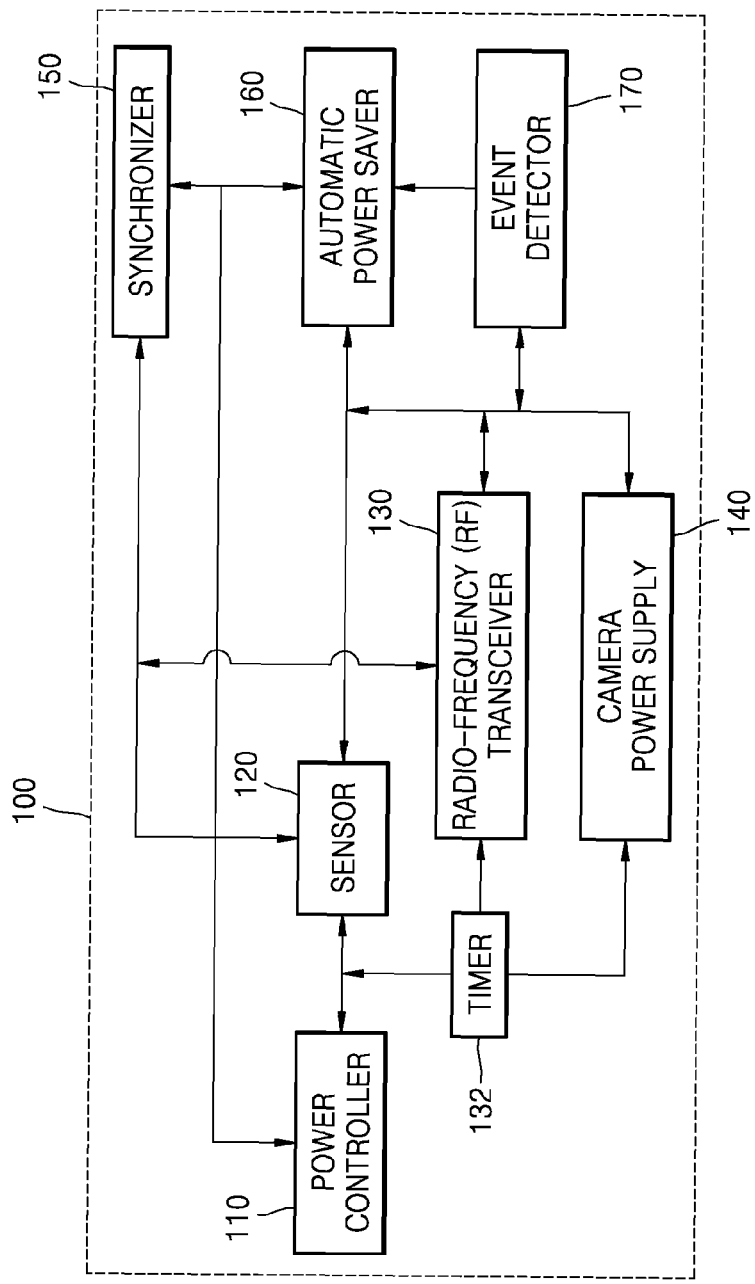
FIG. 1 is a block diagram of an image processing device, according to an exemplary embodiment.

Reference will now be made in detail to exemplary embodiments of the inventive concept, which are illustrated in the accompanying drawings, wherein like reference numerals refer to like elements throughout. In this regard, these embodiments may have different forms and should not be construed as being limited to the descriptions set forth herein. Accordingly, the exemplary embodiments are merely described below, by referring to the figures, to explain aspects of the inventive concept. As used herein, the term "and/or" includes any and all combinations of one or more of the associated listed items. Expressions such as "at least one of", when preceding a list of elements, modify the entire list of elements and do not modify the individual elements of the list.

FIG. 1 is a block diagram of an image processing device 100, according to an exemplary embodiment.

The image processing device 100 includes a power controller 110, a sensor 120, a radio frequency (RF) transceiver 130, a power-supply 140, a synchronizer 150, an automatic power saver 160, and an event detector 170. Here, according to an exemplary embodiment, the power controller 110 may be configured to include the power-supply 140 and the automatic power saver 160 therein.

According to an exemplary embodiment, the image processing device 100 may be implemented in a camera, a monitoring camera, a recording camera, a home-use battery type low-powered monitoring camera, a monitoring device, or a hand-held device, not being limited thereto (hereafter collectively referred to as a "camera"). Thus, the elements of the image processing device 100 as listed above and illustrated in FIG. 1 may also constitute elements of a camera in which the image processing device 100 is included. Also, according to an exemplary embodiment, although some of the elements such as the sensor 120 and the RF transceiver 130 shown in FIG. 1 may be elements of a camera including the image processing device 100, they may not be included in the image processing device 100.

Figure 2:
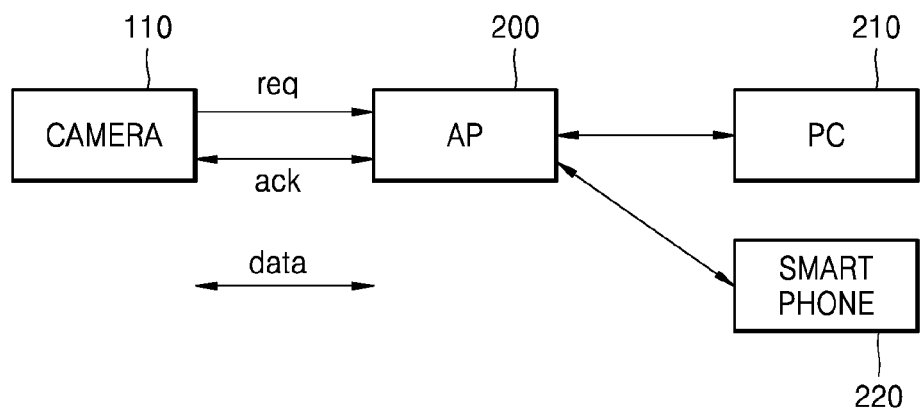
FIG. 2 illustrates signal flows between an image processing device and an access point (AP), according to an exemplary embodiment.

FIG. 2 is a diagram illustrating signal flows between a camera 110 and an access point (AP), according to an exemplary embodiment. Referring to FIGS. 1 and 2, the camera 110 including the image processing device 100 communicates with the AP 200.

According to an exemplary embodiment, the image processing device 100 is configured to transmit a beacon signal, a query signal or a request signal to the AP 200 so as to check whether an event has occurred at the AP 200. The image processing device 100 is also configured, if it is determined that the event has occurred at the AP 200, to capture and transmit an image (or video) to the AP 200. Here, according to an exemplary embodiment, the image may be captured by the sensor 120, and the sensor 120 may include at least one of at least one of an image sensor, an audio sensor, a motion-detection sensor, a shock-detection sensor and a gyro sensor, not being limited thereto. According to an exemplary embodiment, the image processing device 100 may check whether an event has occurred or occurs at the AP 200 by periodically or non-periodically reading a particular register of the AP 200. According to an exemplary embodiment, the image processing device 100 may capture and transmit not only an image (or video) but also audio if it is determined that an event has occurred at the AP 200.

An example in which an event occurs at the AP 200 may be a case when the AP 200 receives a user input or command from a user who uses a personal computer (PC), a smartphone, a tablet PC, a hand-held device, or the like. If the AP 200 receives an input signal from a user, it is determined that an event has occurred.

The image processing device 100 checks whether the AP 200 has received or receives a user input, by periodically or non-periodically transmitting a beacon signal to the AP 200. If it is determined that an event which is a user input has occurred or occurs, the image processing device 100 captures an image and transmits the captured image to the AP 200. An example of transmitting a beacon signal to the AP 200, receiving an acknowledgement (ACK) signal and/or a response signal from the AP 200, and transmitting an image captured by the image processing device 100 to the AP 200, which are performed by the image processing device 100, is described with reference to FIG. 4.

Hereinafter, referring to FIG. 1, an internal configuration of the image processing device 100 is described in detail.

The power controller 110 separately controls power necessary for driving the sensor 120 and/or the RF transceiver 130, and power necessary for driving a plurality of elements, other than the sensor 120 and the RF transceiver 130, constituting the camera 110. Also, the RF transceiver may be replaced with a different type of wired or wireless transceiver such as an optical transceiver according to a situation in which the image processing device 100 communicates with the AP 200.

According to an exemplary embodiment, the sensor 120 may be always set to be in a turn-on or activated state to be able to detect an event input through the camera which is different from the event that occurs at the AP 200 as described above. According to an exemplary embodiment, if the RF transceiver 130 transmits a beacon signal to the AP 200, shown in FIG. 2, and receives an ACK signal and/or a response signal corresponding thereto from the AP 200, the power controller 110 may supply power to or activate not only the sensor 120 and the RF transceiver 130 but also a plurality of other elements constituting the image processing device 100 only while an image captured by the image processing device is being transmitted, or supply power to or activate these elements of the image processing device 100 only at a predetermined time preset by a user, or only during a preset period of time, or supply power to or activate the sensor 120, the RF transceiver 130 and the plurality of other elements of the image processing device 100 to place these elements continuously in a turn-on or activated state.

According to an exemplary embodiment, the power controller 110 may be configured to control the power-supply 140 not to supply power to or deactivate at least some elements included in the camera 110 other than the sensor 120 and/or the RF transceiver 130 while supplying power to or activate the sensor 120 and/or the RF transceiver 130. In other words, the power controller 110 may reduce power consumption by supplying power to or activating only the sensor 120 for detecting an event input through the camera 110 and/or the RF transceiver 130 for receiving a signal indicating that an event has occurred or occurs at the AP 200, and not supplying power to or deactivating other elements of the image processing device 100.

According to an exemplary embodiment, if an event is detected by the sensor 120, the synchronizer 150 generates a beacon signal and transmits this beacon signal to the AP 200, shown in FIG. 2, via the RF transceiver 130. In this case, the beacon signal includes information indicating that the event is detected by the sensor 120. If the image processing device 100 receives an ACK signal indicating that the AP 200 has received the beacon signal, the image processing device 100 captures an image by turning on a plurality of elements in addition to the sensor 120 and/or the RF transceiver 130 in the camera 110, and then, transmits the captured image to the AP 200. This is described in detail with reference to FIGS. 4 and 5. According to an exemplary embodiment, the event detected by the sensor 120 may include input of a predetermined image (or video) or audio at the sensor 120.

The automatic power saver 160 controls a plurality of elements of the camera 110 to be in a power-off or deactivation state by controlling the power-supply 140 not to supply power to or deactivate the plurality of elements of the image processing device 100, other than a case when the sensor 120 detects an event or the RF transceiver 130 transmits a beacon signal to the AP 200, shown in FIG. 2.

Figure 3:
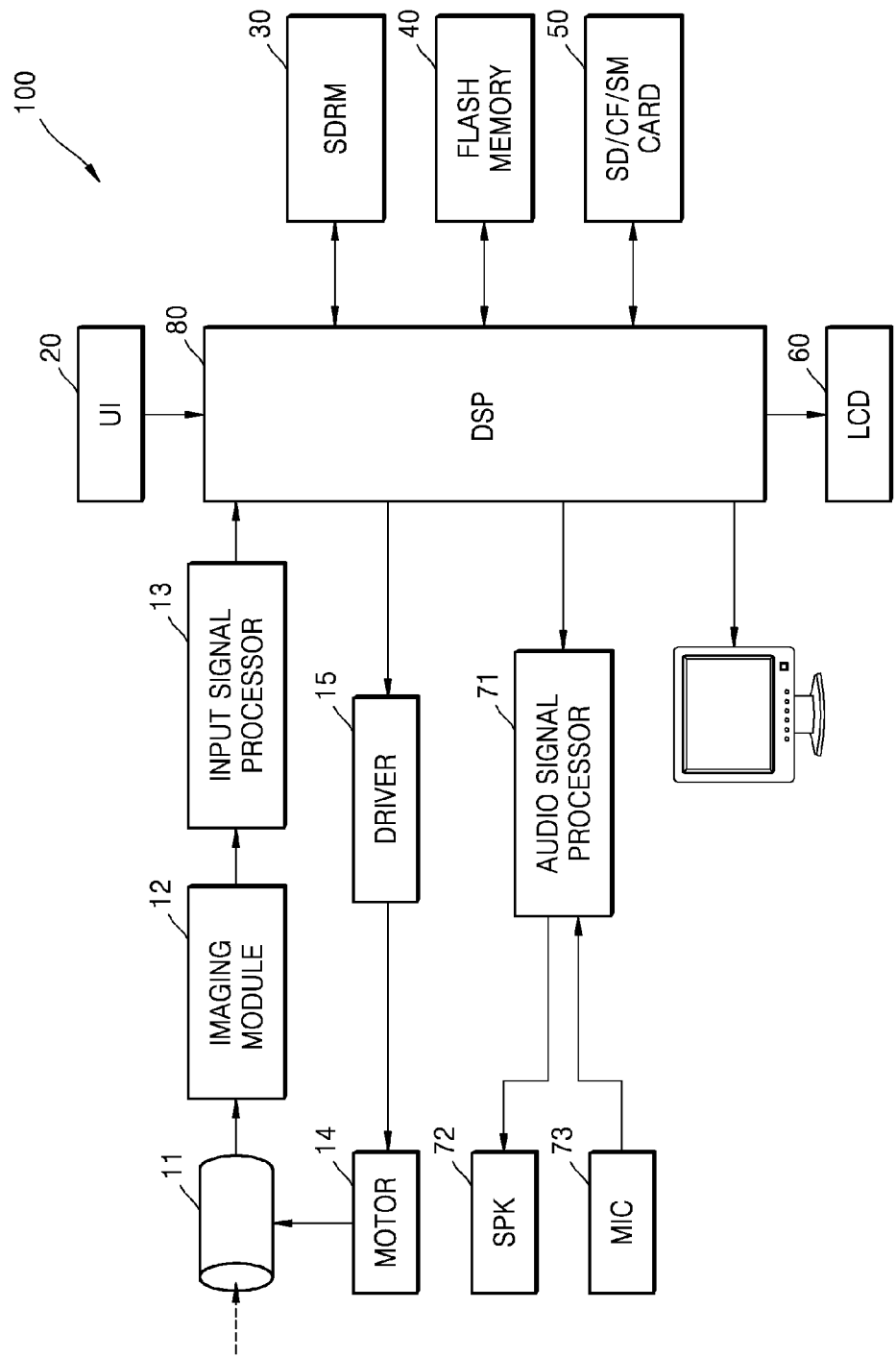
FIG. 3 is a block diagram of an image processing device, according to another exemplary embodiment.

For this, according to an exemplary embodiment, a digital signal processor (DSP) 80 shown in FIG. 3, which may be equivalent to the power controller 110 in FIG. 1, controls power to be provided to a minimum number of elements of the camera 110 shown in FIG. 3, e.g., the sensor 120, the RF transceiver 130, a memory (not shown), and a battery (not shown) which is equivalent to the power-supply in FIG. 1. In this case, the DSP 80 may be configured to control the battery to supply power to the sensor 120 and/or the RF transceiver 130 separately from the other elements of the camera 110 except the memory.

An event detector 170, in order to detect occurrence of an event at the AP 200, checks whether there has been or is a user command or user input received by the AP 200 by analyzing an ACK signal and/or a response signal which the AP 200 transmits to the RF transceiver 130 in response to a beacon signal transmitted from the RF transceiver 130 periodically or non-periodically.

FIG. 3 is a block diagram of the image processing device 100, according to another exemplary embodiment. The image processing device 100 includes an optical module 11 to which an optical signal generated by capturing an image of a subject is input, an imaging module 12 for converting the optical signal input via the optical module 11 into an electric signal, and an input signal processor 13 for performing signal processing, such as performing noise reduction processing on the electric signal provided by the imaging module 12 and converting the electric signal into a digital signal. The image processing device 100 also includes a motor 14 for driving the optical module 11 and a driver 15 for controlling an operation of the motor 14.

The image processing device 100 may further include a user input (UI) interface 20 for receiving a manipulation signal input by a user, a synchronous dynamic random access memory (SDRAM) 30 for temporarily storing an input image, data required for performing an operation, and a result of the operation, an algorithm necessary for the operation of the image processing device 100, a flash memory 40 for storing set data, and a secure digital (SD)/compact flash (CF)/start media (SM) card 50 that is a recording device for storing an image file.

A liquid crystal display (LCD) device 60 is mounted on the image processing device 100 as a display device. Additionally, the image processing device 100 may include an audio signal processor 71 for converting input sound into a digital signal, converting a digital signal of an audio source into an analog signal, or generating an audio file, a speaker 72 for outputting sound, and a microphone 73 for receiving sound.

The image processing device 100 includes the DSP 80 for controlling the operations of the image processing device 100. The DSP 80 may perform image signal processing and control each component of the image processing device 100. The image signal processing includes image compression. Additionally, the DSP 80 is configured to selectively control power of a sensor module that includes a sensor constituting the imaging module 12, an image sensor, an audio sensor, a motion-detection sensor, or a gyro sensor, an RF module, and other elements.

Each element of the image processing device 100 in FIG. 3 is described herebelow in detail.

The optical module 11 may include a lens for concentrating an optical signal, an iris for adjusting an amount of the optical signal (an amount of light), and a shutter for controlling input of the optical signal. The motor 14 for driving the optical module 11 may adjust a location of the lens or a degree of openness of the iris, and drive an operation of the shutter so as to perform operations such as auto focusing, adjustment of automatic exposure, adjustment of the iris, zooming, or focus changing.

The motor 14 is controlled by the driver 15. The driver 15 controls the operation of the motor 14 according to a control signal input from the DSP 80. According to an exemplary embodiment, the DSP 80 may control the motor 14 to be deactivated unless an event such as a user input is detected or an event is detected by the sensor 120 (FIG. 1).

The imaging module 12 receives an optical signal input from the optical module 11 and forms an image of a subject. A complementary metal-oxide semiconductor image sensor (CMOS) array or a charge-coupled device (CCD) sensor array may be employed as the imaging module 12.

According to an exemplary embodiment, the DSP 80 may supply power to or activate only the CMOS sensor array, a CCD sensor array, and other sensors preset by a user, and turn off some other elements or place these elements in a sleep mode, i.e., a deactivated state, so as to reduce power consumption.

Figure 4A:
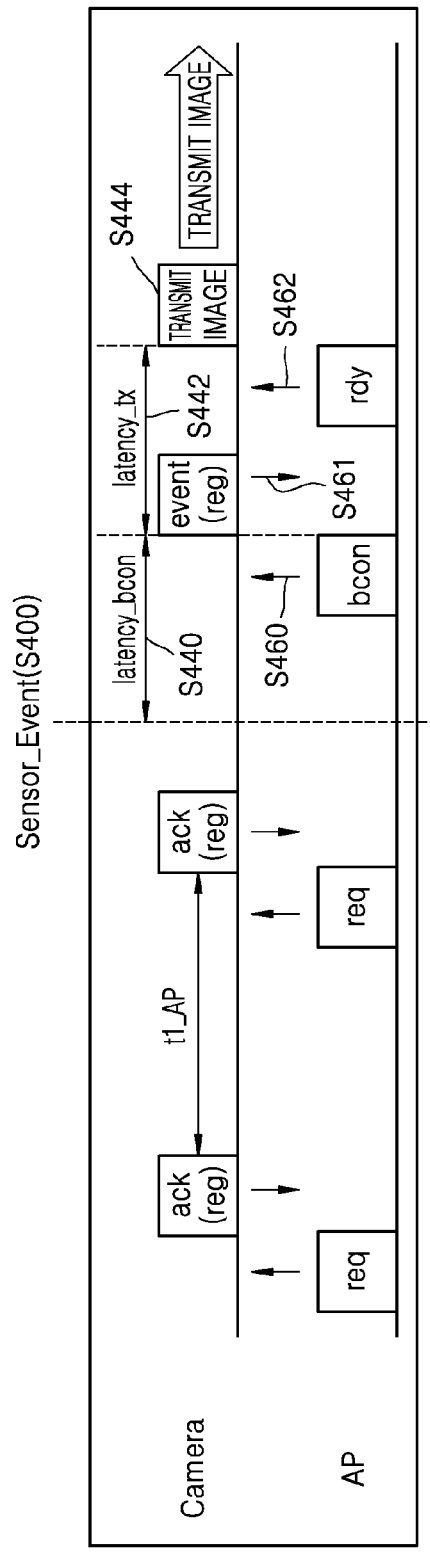
FIGS. 4A and 4B illustrate operations of synchronization between an image processing device and an AP if an event is detected by a camera, according to a related art system and an exemplary embodiment of the inventive concept, respectively.
Figure 4B:
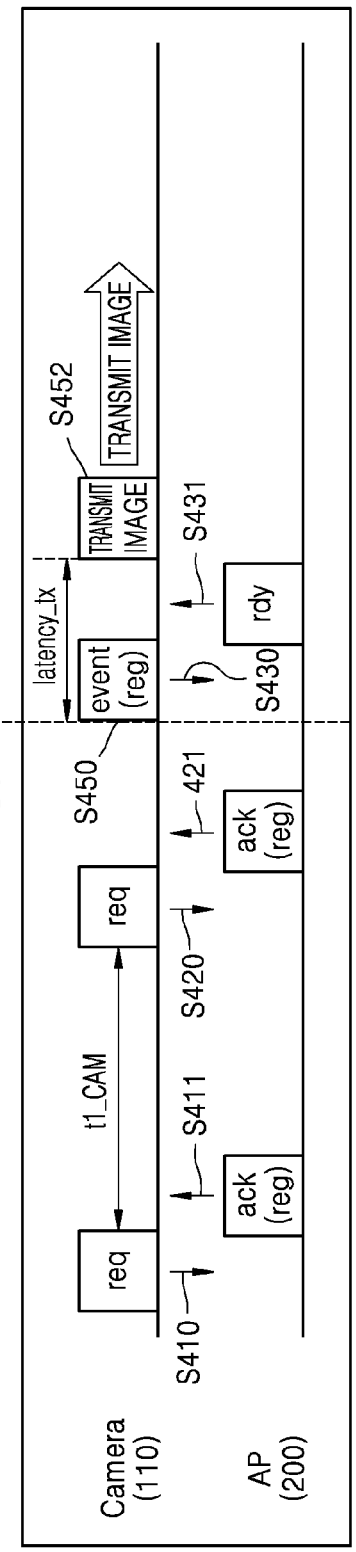

FIGS. 4A and 4B illustrate performing a synchronization operation between an image processing device and an AP if an event is detected by the camera 110, according to a related art system and an exemplary embodiment of the inventive concept, respectively.

Referring to FIG. 4B, the RF transceiver included in the image processing device 100 periodically or non-periodically transmits a beacon signal in S410 or S420, and thus, checks whether an event has occurred or occurs at the AP 200 in S411 or S421. After signals are exchanged between the image processing device 100 and the AP 200 in S410, S411, S420, or S421 at an early point of time, even though the RF transceiver does not receive an ACK signal from the AP 200 in S411 or S421, the RF transceiver may be configured to periodically or non-periodically transmit a beacon signal to the AP 200.

When an event is detected by the sensor 120, the image processing device 100 may transmit a beacon signal to the AP 200 in S430. In this case, the beacon signal in S430 includes information indicating that the event is detected by the sensor 120.

According to an exemplary embodiment, if the image processing device 100 transmits an image after an event is detected by the sensor 120, the image processing device 100 may adjust synchronization with the AP 200.

In the related art system referring to FIG. 4A, even though an event is detected by a sensor in S400, an image processing device was not able to transmit an image corresponding to the event to an AP in S444 unless the image processing device receives a beacon signal from the AP in S460, transmits to the AP a signal indicating that the event has occurred in S461 in response to the beacon signal, and receives from the AP another signal indicating that the image processing device may transmit the image in S462. In this process, latency (latency_bcon) that occurs in S440 in a process of receiving the signal from the AP in S460 after the event is detected by the sensor 120 in S400 and another latency (latency_tx), which occurs in S442 until the image processing device receives from the AP the signal indicating that the image processing device may transmit an image in S462, may occur.

However, according to an exemplary embodiment referring to FIG. 4B, if an event is detected by the sensor 120 in the image processing device 100 in S400, since the image processing device 100 transmits to the AP 200 a signal notifying the detection of the event in S430, a latency that may occur until the image processing device 100 transmits an image to the AP in S452 after receiving from the AP a signal indicating that the image processing device may transmit the image in S431, may be minimized.

Figure 5:
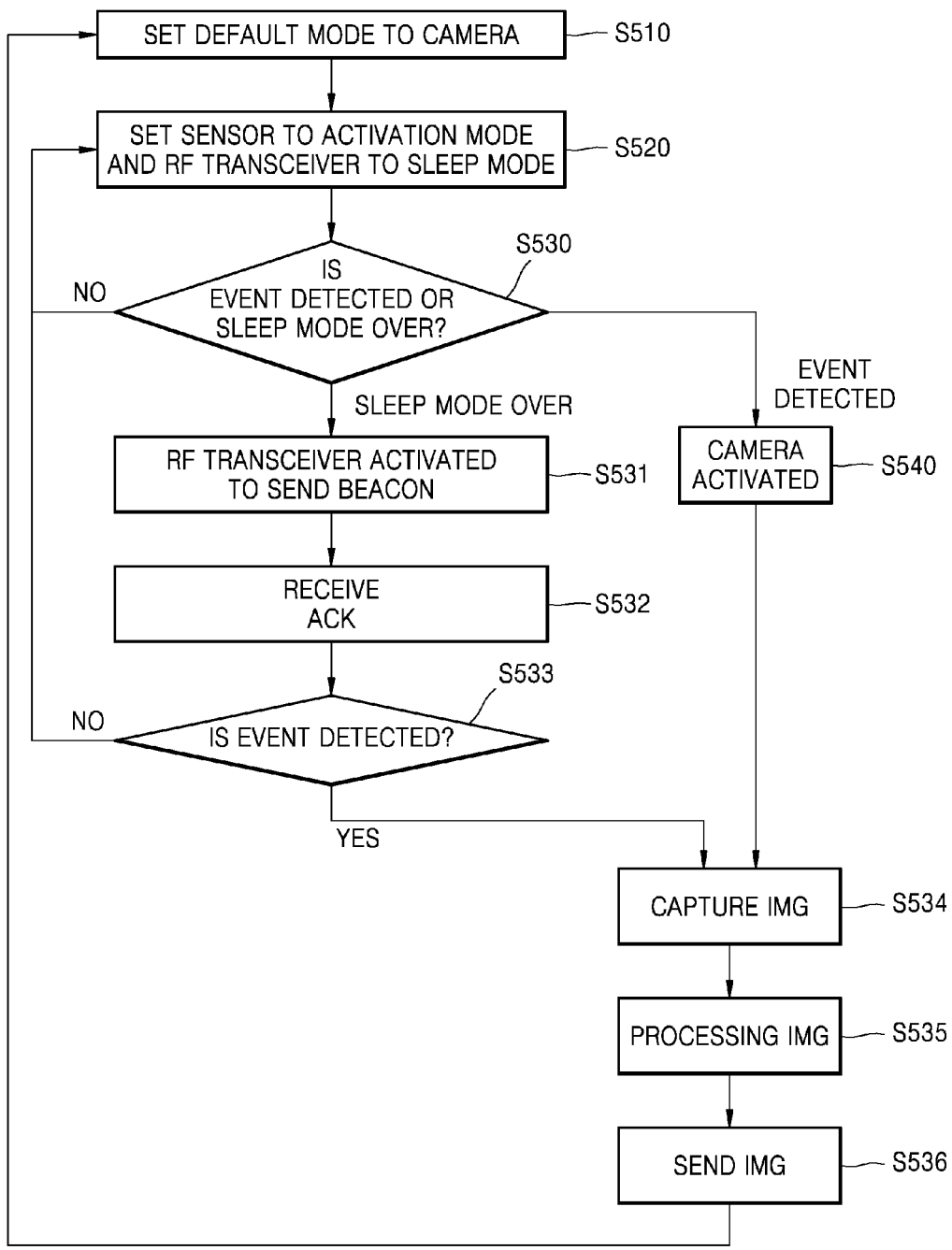
FIG. 5 illustrates operations of controlling power supply, which is performed by an image processing device, according to an exemplary embodiment.

FIG. 5 illustrates an operation of controlling power supply, which is performed by the image processing device 100, according to an exemplary embodiment.

According to an exemplary embodiment, the power controller 110 included in the image processing device 100 controls power necessary for driving the sensor 120 and/or the RF transceiver 130 separately from power necessary for driving a plurality of elements, other than the sensor 120 and the RF transceiver 130, constituting the camera 110, in operation S510.

The power controller 110 sets an activation mode (activated state) as a default mode (deactivate state) to the sensor 120 and/or the RF transceiver 130, and sets a deactivation mode as a default mode to the plurality of elements, other than the sensor 120 and the RF transceiver 130, included in the camera 110. The deactivation mode may include a power-off state or a sleep state.

The power controller 110 may be configured to always supply power to or activate the sensor 120 and/or the RF transceiver 130, and may be configured in various different ways, such as supplying power periodically, non-periodically, consistently, or intermittently, according to a setting by a user. FIG. 5 shows an exemplary embodiment in which power is supplied to the sensor 120 all the time after the image processing device 100 is turned on, and power is supplied to the RF transceiver 130 during a sleep time period of t1 (possible set in a timer 132 shown in FIG. 1) in operation S520, but it may be understood that various modifications thereto may be made.

In S530, If the event detector 170 detects an event by transmitting a beacon signal to the AP 200 and receiving an ACK signal and/or a response signal from the AP 200, or the sensor 120 detects an event in the camera 110, a plurality of elements in addition to the sensor 120 and the RF transceiver 130 in the camera 110 are supplied power or activated in operation S540.

However, if it is determined that the sleep time period of t1 has passed in S530 although an event is not detected, the RF transceiver 130 is activated (i.e., wakes up) to transmit a beacon signal to the AP 200 in S531, and receives an ACK signal and/or a response signal from the AP 200 in S532. Then, if it is determined by the event detector 170 that an event has occurred or occurs at the AP, the image processing device 100 captures an image in operation S534, performs image processing in operation S535, and then, transmits the captured image to the AP 200 in operation S536.

As described above, according to the exemplary embodiments, an image processing device checks whether an event has occurred or occurs by periodically or non-periodically reading a particular register of an AP, and a sensor included in the image processing device detects an event.

If the event is detected, the image processing device notifies to the AP information indicating that the event is detected. Thus, latency, which may occur when synchronization between the image processing device and the AP is performed after the event is detected, may be reduced.

Additionally, the image processing device may be driven with low power, by controlling whether to activate or deactivate power of elements of the image processing device without having to receive an external signal from the AP.

According to the above exemplary embodiments of the inventive concept, a low-powered image processing device may be used for a home-use battery type low-powered monitoring camera or an image processing device for monitoring children, weak people, or old people.

The above exemplary embodiments can also be implemented through computer-readable code/instructions in/on a medium, e.g., a computer-readable medium, to control at least one processing element to implement any above-described embodiment. The medium can correspond to any medium/media permitting the storage and/or transmission of the computer-readable code.

The computer-readable code can be recorded/transferred on a medium in a variety of ways, with examples of the medium including recording media, such as magnetic storage media (e.g., read-only memory (ROM), floppy disks, hard disks, etc.) and optical recording media (e.g., compact disc (CD)-ROMs, or digital versatile discs (DVDs)), and transmission media such as Internet transmission media. Thus, the medium may be such a defined and measurable structure including or carrying a signal or information, such as a device carrying a bitstream according to one or more exemplary embodiments. The media may also be a distributed network, so that the computer-readable code is stored/transferred and executed in a distributed fashion. Furthermore, the processing element could include a processor or a computer processor, and processing elements may be distributed and/or included in a single device.

At least one of the components, elements or units represented by a block as illustrated in FIGS. 1 and 3 may be embodied as various numbers of hardware, software and/or firmware structures that execute respective functions described above, according to an exemplary embodiment. For example, at least one of these components, elements or units may use a direct circuit structure, such as a memory, processing, logic, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of one component, element or unit may be performed by another of these components, element or units. Further, although a bus is not illustrated in the above block diagrams, communication between the components, elements or units may be performed through the bus. Functional aspects of the above exemplary embodiments may be implemented in algorithms that execute on one or more processors. Furthermore, the components, elements or units represented by a block or processing steps may employ any number of related art techniques for electronics configuration, signal processing and/or control, data processing and the like.

It should be understood that the exemplary embodiments described herein should be considered in a descriptive sense only and not for purposes of limitation. Descriptions of features or aspects within each embodiment should typically be considered as available for other similar features or aspects in other embodiments.

While one or more exemplary embodiments have been described with reference to the drawings, it will be understood by those of ordinary skill in the art that various changes in form and details may be made therein without departing from the spirit and scope of the inventive concept as defined by the following claims.

What is claimed is:

1. An image processing device comprising:
   an event detector configured to detect a first event occurring at an access point (AP) by analyzing a response signal which the AP transmits to a transceiver of a camera in response to a query signal transmitted from the transceiver to the AP; and
   a power controller configured to place a sensor, the transceiver and a plurality of other elements constituting the camera in an activated state, in response to the event detector detecting the first event,
   wherein the power controller is further configured to place the other elements in a deactivated state while at least one of the sensor and the transceiver is in the activated place, unless the first event is detected by the event detector, a second event is detected by the sensor, or a predetermined setting is provided.

2. The image processing device of claim 1, wherein the power controller is further configured to place the sensor in the activated state while placing the other elements and the transceiver in the deactivated state.

3. The image processing device of claim 1, further comprising a synchronizer configured to generate and transmit an event signal to the AP via the transceiver, in response to the sensor detecting the second event,
   wherein the event signal comprises information indicating that the sensor has detected the second event.

4. The image processing device of claim 3, wherein the synchronizer is further configured to transmit the event signal to the AP via the transceiver not as a response to a query signal from the AP checking whether the second event is detected by the sensor.

5. The image processing device of claim 4, wherein the sensor is configured to capture at least one of an image, video and audio and the transceiver is configured to transmit the captured at least one of the image, video and audio to the AP, if an acknowledgement (ACK) signal from the AP is received in response to the event signal.

6. The image processing device of claim 1, wherein the transceiver is configured to transmit the query signal to the AP periodically to check whether the first event has occurred or occurs at the AP.

7. The image processing device of claim 1, wherein the controller is further configured to place the transceiver in the deactivated state while the transceiver is not in communication with the AP.

8. The image processing device of claim 1, wherein the deactivated state is a power-off state or a power-sleep state.

9. The image processing device of claim 1, wherein the event detector is configured to transmit the query signal to the AP repeatedly with a predetermined time interval set in the image processing device.

10. The image processing device of claim 1, wherein the first event comprises a user input which is received at a user terminal connected to the AP.

11. The image processing device of claim 10, wherein the second event comprises input of a predetermined image, video or audio at the sensor.

12. The image processing device of claim 1, wherein the sensor comprises at least one of an image sensor, an audio sensor, a motion-detection sensor, a shock-detection sensor, and a gyro sensor.

13. An image processing device comprising
    a synchronizer configured to generate and transmit an event signal to an access point (AP) via a transceiver of a camera, in response to a sensor of the camera detecting a first event; and
    a power controller configured to place the sensor, the transceiver and a plurality of other elements constituting the camera in an activated state, in response to the sensor detecting the first event,
    wherein the power controller is further configured to place the other elements in a deactivated state while at least one of the sensor and the transceiver is in the activated place, unless the first event is detected by the sensor or a second event occurring at the AP is detected, or a predetermined setting is provided.

14. The image processing device of claim 13, wherein the synchronizer is further configured to transmit the event signal to the AP via the transceiver not as a response to a query signal from the AP checking whether the first event is detected by the sensor.

15. The image processing device of claim 13, wherein the sensor is configured to capture at least one of an image, video and audio and the transceiver is configured to transmit the captured at least one of the image, video and audio to the AP, if an acknowledgement (ACK) signal from the AP is received in response to an event signal which is sent to the AP by the transceiver to indicate detection of the first event by the sensor.

16. A method of driving an image processing device, the method comprising:
    detecting a first event occurring at an access point (AP) by analyzing a response signal which the AP transmits to a transceiver of a camera in response to a query signal transmitted from the transceiver to the AP;
    controlling a sensor, the transceiver and a plurality of other elements constituting the camera to be in an activated state, in response to the detecting the first event; and
    controlling the other elements to be in a deactivated state while at least one of the sensor and the transceiver is in the activated place, unless the first event is detected, a second event occurring at the AP is detected, or a predetermined setting is provided.

17. The method of claim 16, further comprising generating and transmitting an event signal to the AP via the transceiver, in response to detection of the first event,
    wherein the event signal comprises information indicating detection of the first event.

18. The method of claim 17, further comprising:
    receiving an acknowledgement (ACK) signal from the AP in response to the event signal sent to the AP; and
    capturing, processing and transmitting to the AP at least one of an image, video and audio in response to the ACK signal.

19. The method of claim 18, wherein the deactivated state is a power-off state or a power-sleep state.

* * * * *